United States Patent
Temming

[11] Patent Number: 6,070,978
[45] Date of Patent: Jun. 6, 2000

[54] SPECTACLES

[76] Inventor: Markus Temming, Isselhorster Strasse 374, D-33334 Gütersloh, Germany

[21] Appl. No.: 09/368,648

[22] Filed: Aug. 5, 1999

[51] Int. Cl.[7] .................................................. G02C 1/04
[52] U.S. Cl. ........................ 351/103; 351/105; 351/108; 351/140
[58] Field of Search .............................. 351/41, 103, 105, 351/106, 107, 108, 109, 140

[56] References Cited

U.S. PATENT DOCUMENTS 5,135,296  8/1992  Lindberg et al. ..................... 351/106

Primary Examiner—Huy Mai
Attorney, Agent, or Firm—Herbert L. Lerner; Laurence A. Greenberg; Werner H. Stemer

[57] ABSTRACT

Spectacles with an improved fastening of spectacle lenses on a rimless spectacle mount have a spectacle lens which is secured to the spectacle mount with at least one filament which partially encloses the periphery of the spectacle lens. The spectacle lens is provided with at least one through-opening for the filament. The filament is guided through the through-opening and has a thickened portion behind and/or in front of the spectacle lens. The thickened portion is thicker than the width of the through-opening. The filament is wound around the spectacle mount at least once.

4 Claims, 1 Drawing Sheet

SPECTACLES

BACKGROUND OF THE INVENTION

Field of the Invention

The invention relates to spectacles having a spectacle mount with a securing device for the spectacle lenses and with side pieces connected to the spectacle mount via hinges.

German Patent No. 923 812 discloses a securing device for spectacle lenses that has a plastic filament which partially encloses a spectacle lens and which is secured at its ends in the spectacle mount.

The known method of fastening a spectacle lens with a plastic filament requires the presence of separate fastening parts, such as wedge-shaped rivets, on a spectacle mount. As a result, the manufacturing of such a spectacle mount is unnecessarily complicated and the fastening parts nevertheless remain very noticeable, in particular in the case of extremely thin spectacle mounts.

SUMMARY OF THE INVENTION

It is accordingly an object of the invention to provide spectacles which overcome the above-mentioned disadvantages of the heretofore-known spectacles of this general type and which have an improved fastening of spectacle lenses on rimless spectacle mounts.

With the foregoing and other objects in view there is provided, in accordance with the invention, spectacles, comprising:

a spectacle lens having a front side, a rear side, and having a through-opening of a given width formed therein;

a spectacle mount;

a securing device for securing the spectacle lens to the spectacle mount, the securing device including a filament wound at least once around the spectacle mount, guided partially around the spectacle lens along a periphery thereof and guided through the through-opening, the filament having a thickened portion on at least one of the front side and the rear side of the spectacle lens, the thickened portion having a thickness greater than the given width of the through-opening; and side pieces attached to the spectacle mount.

In accordance with the invention, a spectacle lens is fastened to a spectacle mount through the use of a filament. A through-opening or passage for the filament is provided in the spectacle lens. In the front of the spectacle lens, as seen in the direction along which the filament is pulled out, the filament is provided with a thickened portion which is thicker than the narrowest part of the through-opening is wide. As a result, the end of the filament can be secured directly in the spectacle lens and does not have to be fastened on the spectacle mount.

In order to fasten a spectacle lens, the filament is wound around the spectacle mount at least once and is then guided in a known manner through an outer groove in the edge of the lens. The other end of the filament is either secured on the spectacle mount or likewise directly in the lens. This type of fastening not only allows new forms and styles of spectacles, but also simplifies the construction of spectacle mounts and the assembly of the spectacle lenses, because no additional fastening parts for the spectacle lenses need to be provided on the spectacle mount. The requirements to be met by the bore or through-opening in the spectacle lens, which may, in particular, be a plastic lens, can be minimized since, for example, a heat-deformed end of a filament adapts itself to the contour of the bore. In addition, the risk of breaking the spectacle lens is reduced since there are no stresses imposed by conventional fastening parts acting on the lens.

A particularly advantageous embodiment of the securing device for a spectacle lens provides a filament which is guided with its ends, through in each case one through-opening in a spectacle lens and has in each case one thickened portion and the ends are thus secured against being drawn cut. The through-openings are preferably of conical share, with the result that at least part of the thickened portion of a filament end can be received therein or, ultimately, the part which projects can be removed and none of the material of the filament projects beyond the lens surface.

This type of fastening a spectacle lens to a spectacle mount is extremely simple and allows a very large number of variations through the use of one, two or more filaments in one or more through-openings and windings coiled once or multiple times around the spectacle mount for the purpose of fastening.

Other features which are considered as characteristic for the invention are set forth in the appended claims.

Although the invention is illustrated and described herein as embodied in spectacles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
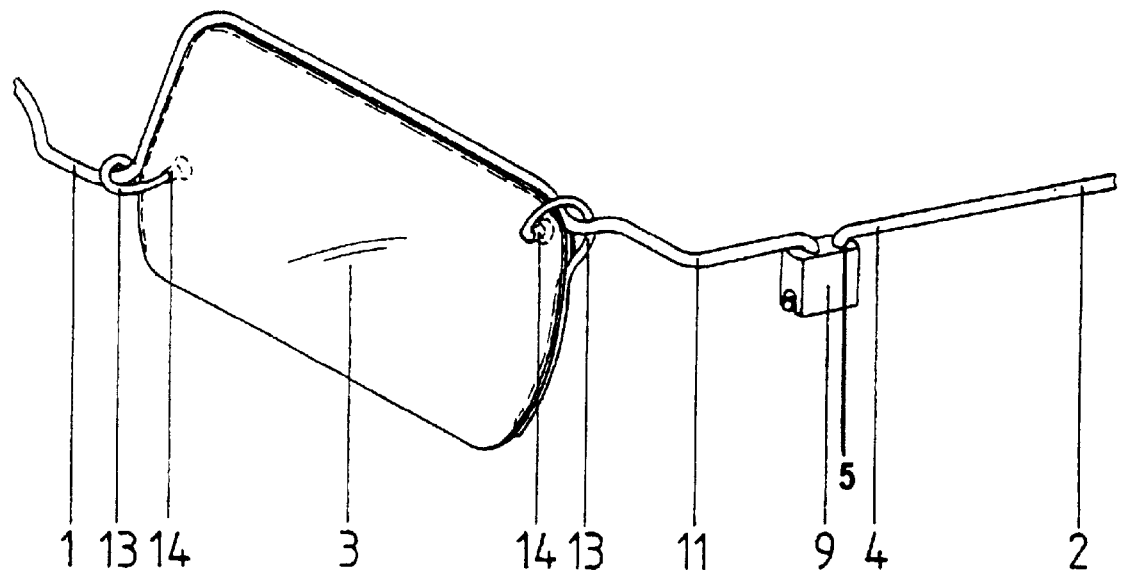
FIG. 1 is a partial perspective view of a spectacle mount, a spectacle lens, a securing device for the spectacle lens, and a hinge.
Figure 2:
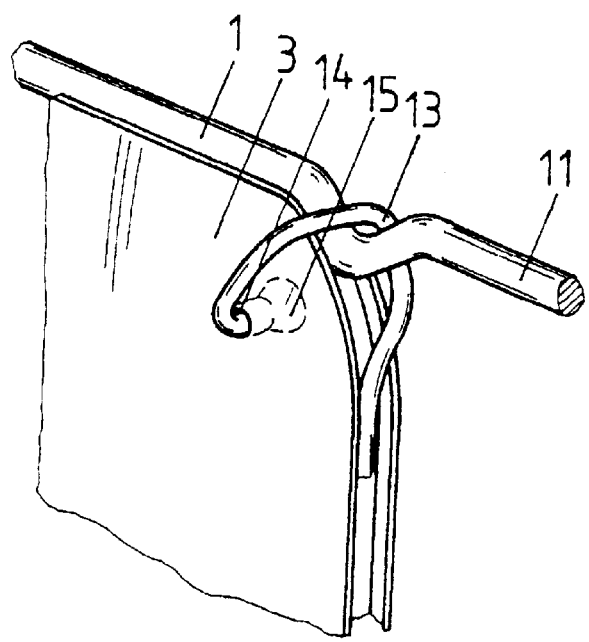
FIG. 2 is an enlarged perspective view of the securing device for the spectacle lens.

Referring now to the figures of the drawings in detail and first, particularly, to FIG. 1 thereof, there are shown spectacles which comprise a spectacle mount 1 with a securing device for the spectacle lenses 3 and with side pieces 2 which are articulated by in each case one hinge block 9. The hinge block 9 is provided near a corner 11 of the spectacle mount 1 and has a cylindrical recess 5. The recess 5 is provided in a vertical direction for accepting the side-piece end 4, which is formed approximately with a right angle and extends into the recess 5.

The method of securing a spectacle lens 3 through the use of a filament 13 which at least partially encloses the periphery of a spectacle lens 3 is performed by first providing a through-opening 14 for the filament 13. The filament 13 is provided with a thickened portion 15 behind the through-opening 14, with the result that it cannot be drawn out of the through-opening 14. The filament 13 is then wound around the spectacle mount 1 at least once and thus fastens the spectacle lens. The other end of the filament 13 may be secured on the spectacle mount 1 in a conventional manner or, likewise once it has been looped around the spectacle mount at least once, may be guided through a through-opening 14 of a spectacle lens 3 and be provided with a thickened portion behind the spectacle lens.

A through-opening 14 has preferably a conical shape, so that the end piece of a filament 13 can be removed in the region of the surface of a lens and does not project beyond the contour of a spectacle lens 3.

Embodiments of securing devices for spectacle lenses in accordance with the invention which each have a plurality of through-openings 14 and a plurality of filaments 13 are not illustrated in the drawings.

I claim:

1. Spectacles, comprising:
   a spectacle lens having a front side, a rear side, and having a through-opening of a given width formed therein;
   a spectacle mount;
   a securing device for securing said spectacle lens to said spectacle mount, said securing device including a filament wound at least once around said spectacle mount, guided partially around said spectacle lens along a periphery thereof and guided through said through-opening, said filament having a thickened portion on at least one of said front side and said rear side of said spectacle lens, said thickened portion having a thickness greater than the given width of said through-opening; and
   side pieces attached to said spectacle mount.

2. The spectacles according to claim 1, wherein said spectacle lens has a further through-opening formed therein, said filament is guided through said further through-opening and has a further thickened portion, said thickened portions are provided at respective ends of said filament at said rear side of said spectacle lens.

3. The spectacles according to claim 1, wherein said through-opening is an at least partially conical through-opening.

4. The spectacles according to claim 1, including hinges connected to said spectacle mount, said side pieces articulated on said spectacle mount via said hinges.

* * * * *